United States Patent
Stortstrom et al.

(10) Patent No.: US 10,600,138 B2
(45) Date of Patent: Mar. 24, 2020

(54) SYSTEM TO MONITOR UTILIZATION OF PERSONAL PROTECTIVE EQUIPMENT IN RESTRICTED AREAS

(71) Applicant: Intel Corporation, Santa Clara, CA (US)

(72) Inventors: Elizabeth Stortstrom, Portland, OR (US); Andrew Larson, Hillsboro, OR (US); Mark E. Sprenger, Tigard, OR (US); Ralph V. Miele, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/088,241

(22) PCT Filed: Mar. 25, 2016

(86) PCT No.: PCT/US2016/024205
§ 371 (c)(1),
(2) Date: Sep. 25, 2018

(87) PCT Pub. No.: WO2017/164886
PCT Pub. Date: Sep. 28, 2017

(65) Prior Publication Data
US 2019/0087925 A1    Mar. 21, 2019

(51) Int. Cl.
*G06Q 50/26* (2012.01)
*G06K 9/62* (2006.01)
(Continued)

(52) U.S. Cl.
CPC ....... *G06Q 50/265* (2013.01); *G06K 9/00214* (2013.01); *G06K 9/00228* (2013.01);
(Continued)

(58) Field of Classification Search
CPC . G06Q 50/265; G06K 9/6201; G07C 9/00111
(Continued)

(56) References Cited

U.S. PATENT DOCUMENTS

2008/0109099 A1* 5/2008 Moshier ................. G06Q 10/06
                                                       700/103
2008/0136649 A1   6/2008 Van De Hey
(Continued)

OTHER PUBLICATIONS

International Search Report and Written Opinion for International Patent Application No. PCT/US2016/024205, dated Dec. 22, 2016, 13 pages.
(Continued)

*Primary Examiner* — Jeffery A Williams
(74) *Attorney, Agent, or Firm* — Jordan IP Law, LLC

(57) ABSTRACT

Systems, apparatuses and methods of monitoring the utilization of protective equipment by individuals requesting access to a restricted area that requires the use of specific protective equipment, are provided. A protective equipment checker, which includes a proximity sensor, a three-dimensional (3D) camera, and a radio-frequency identification (RFID) reader, performs a full body scan on the individual to determine if the location-specific protective equipment is being worn, or is in the possession of the individual. If a determination is made that the proper protective equipment is being worn, the individual is granted access to the location. If, one the other hand, the required protective equipment is not being worn, entry to the location is denied.

24 Claims, 6 Drawing Sheets

(51) Int. Cl.
*G07C 9/00* (2020.01)
*G06K 9/00* (2006.01)
*H04N 13/20* (2018.01)
*G06K 7/10* (2006.01)

(52) U.S. Cl.
CPC ........ *G06K 9/6201* (2013.01); *G07C 9/00111* (2013.01); *H04N 13/20* (2018.05); *G06K 7/10297* (2013.01)

(58) Field of Classification Search
USPC ........................................................ 348/156
See application file for complete search history.

(56) References Cited

U.S. PATENT DOCUMENTS

| | | | |
|---|---|---|---|
| 2009/0040014 A1 | 2/2009 | Knopf et al. | |
| 2013/0086385 A1* | 4/2013 | Poeluev | G06F 12/1416 713/176 |
| 2013/0214903 A1 | 8/2013 | Kalous et al. | |
| 2013/0282609 A1* | 10/2013 | Au | F16P 3/142 705/325 |
| 2014/0226018 A1* | 8/2014 | Wagner | G07C 9/02 348/156 |
| 2014/0307076 A1 | 10/2014 | Deutsch | |

OTHER PUBLICATIONS

International Preliminary Report on Patentability for International Patent Application No. PCT/US2016/024205, dated Sep. 25, 2018, 9 pages.

* cited by examiner

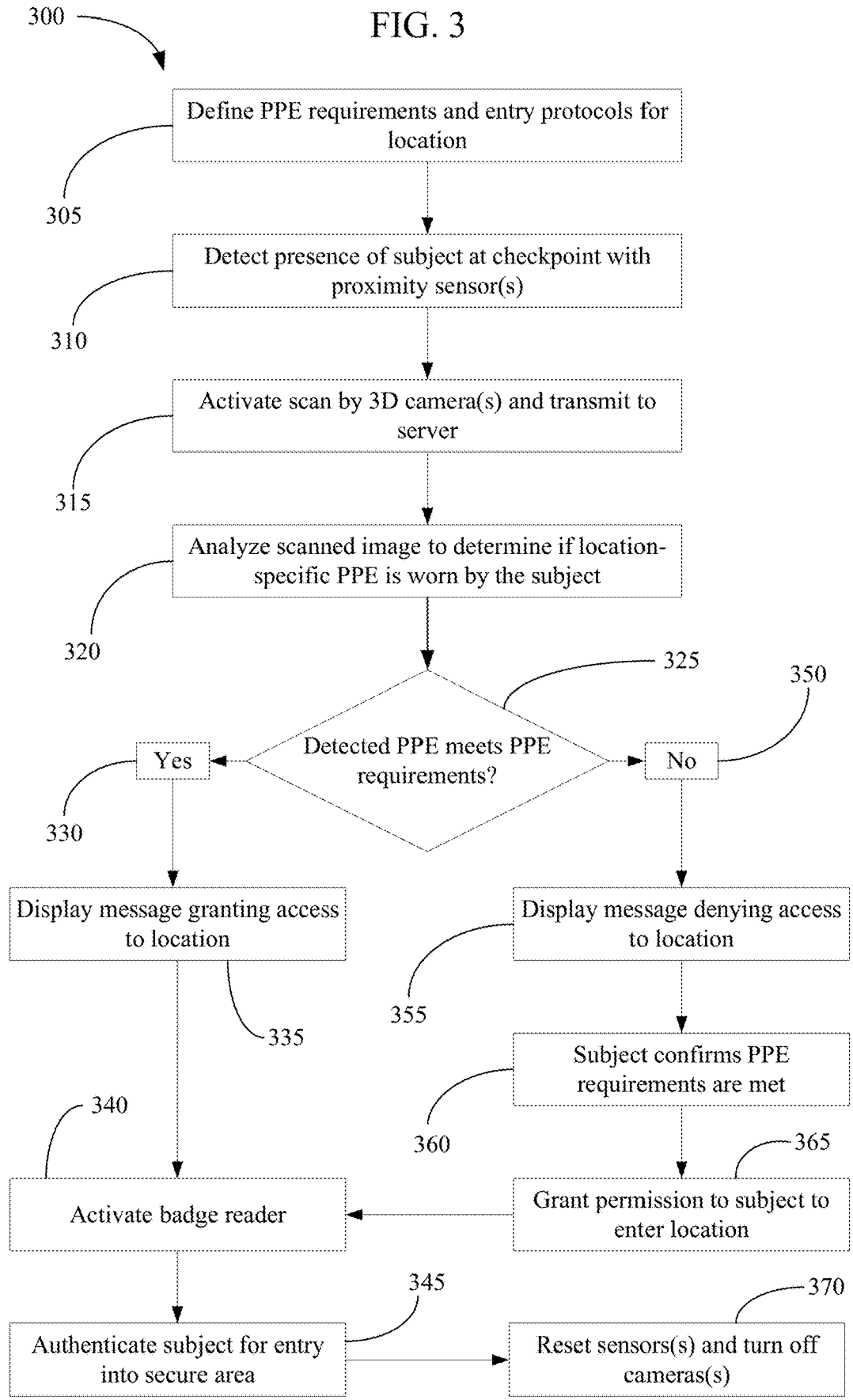

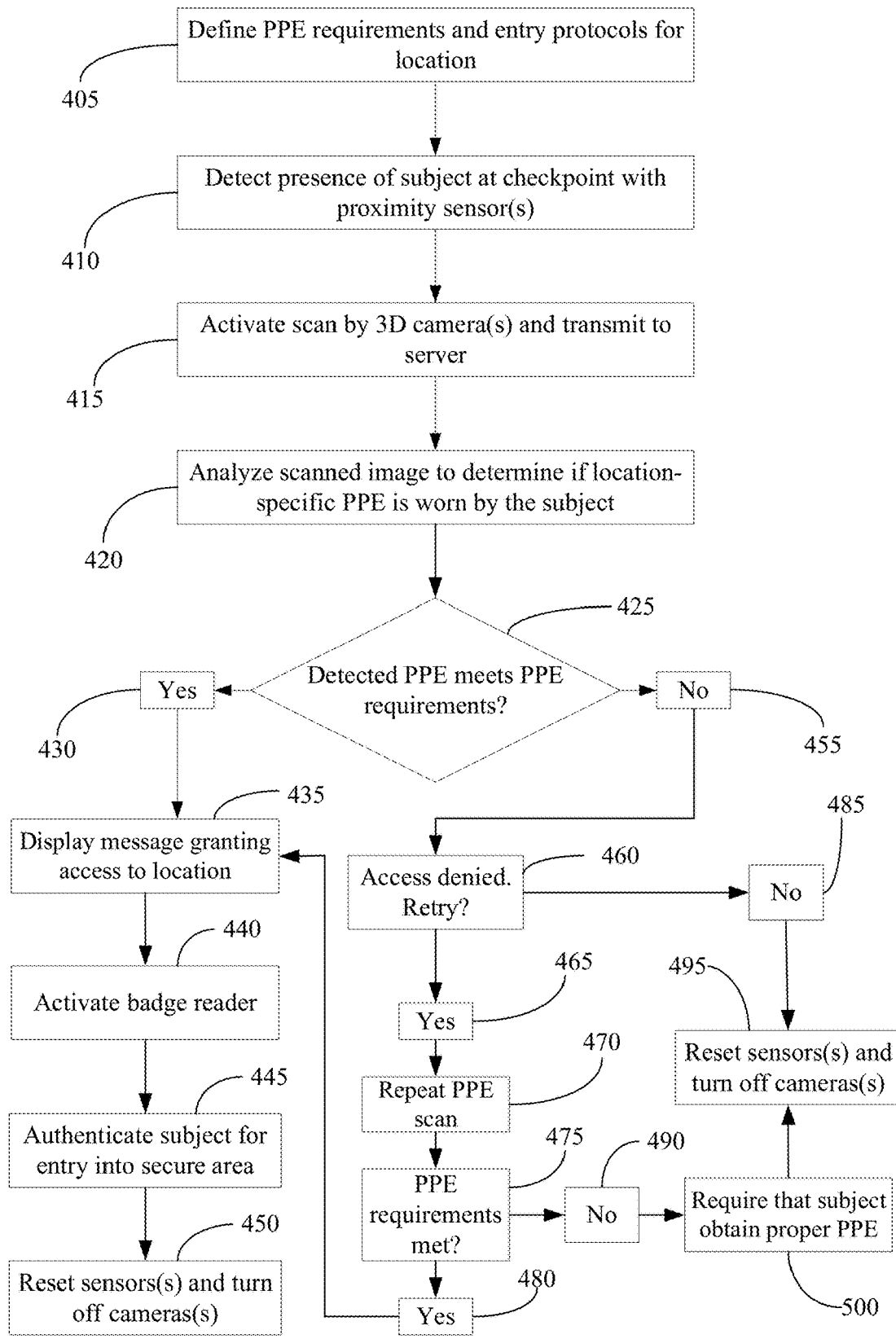

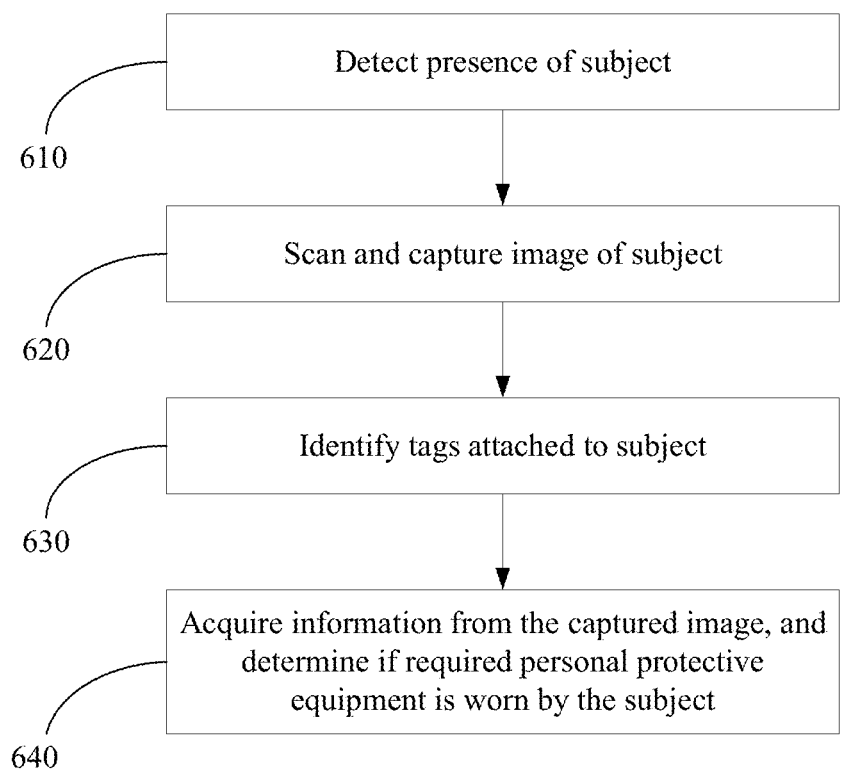

SYSTEM TO MONITOR UTILIZATION OF PERSONAL PROTECTIVE EQUIPMENT IN RESTRICTED AREAS

CROSS-REFERENCE TO RELATED APPLICATIONS

The present application is a U.S. National Phase Patent Application which claims benefit to International Patent Application No. PCT/US2016/024205 filed on Mar. 25, 2016.

BACKGROUND

Technical Field

Embodiments generally relate to the monitoring of personal protective equipment (PPE) in restricted or hazardous areas. More particularly, embodiments relate to a system that monitors the utilization of PPE by individuals who have access to a restricted or hazardous area that requires the use of specific PPE.

Discussion

In various industries, it is sometimes necessary for individuals to enter and work in restricted or potentially hazardous environments. In recent years, there has been a drive to reduce injuries sustained by workers as they perform their duties in hazardous environments. To that extent, workers may be provided with personal protective equipment (PPE) to be worn while in the restricted areas. Typically, in order to access an area that requires protective equipment, the process includes requesting access to the area, and completing training (if required). Once the training sessions are completed, only a single badge scan may be required to enter the area. Failure to wear the protective equipment, however, may occur either accidentally or intentionally. Accordingly, dangerous situations may result under conventional PPE solutions.

BRIEF DESCRIPTION OF THE DRAWINGS

The various advantages of the embodiments of the present invention will become apparent to one skilled in the art by reading the following specification and appended claims, and by referencing the following drawings, in which:

FIG. 3 is a flowchart of an example of a method of monitoring the use of personal protective equipment in a hazardous environment according to an embodiment;

FIG. 4 is a flowchart of another example of a method of monitoring the use of personal protective equipment in a hazardous environment and controlling access to the restricted area according to an embodiment; and FIG. 5 is a flowchart of an example of a method of determining if personal protective equipment is worn in a hazardous environment according to an embodiment.

DETAILED DESCRIPTION OF EXEMPLARY EMBODIMENTS

Figure 1A:
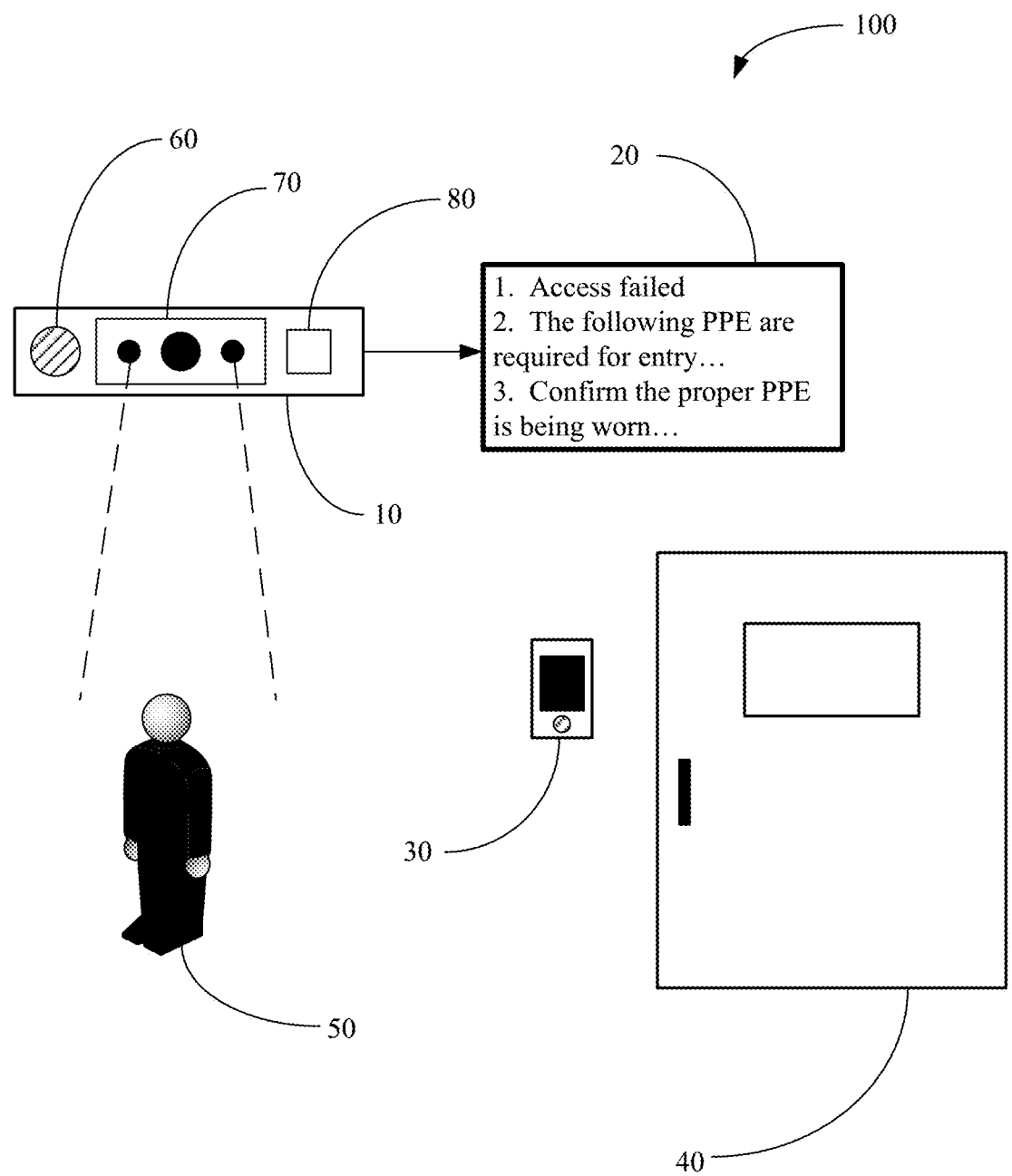
FIGS. 1A and 1B are illustrations of examples of hazardous environment entryways according to embodiments.

Turning now to FIG. 1A, an environment 100 is shown, where a verification process determines whether an individual 50 is wearing a prescribed personal protective equipment (PPE) before entry is granted to a restricted area that requires use of the prescribed protective equipment. The protective equipment may include, for example, hard hats, safety gloves, goggles, and safety boots. In the illustrated example, as the individual 50 approaches the entrance of a restricted area 40, and is within a predetermined range of a PPE checker 10 that is assigned to the restricted area 40, a proximity sensor 60 of the PPE checker 10 may detect the presence of the individual 50. Upon detection of the individual 50 by the proximity sensor 60, a three-dimensional camera (3D) camera 70 may be automatically activated in order to perform a full body scanning operation on the individual 50. Alternately, upon being detected by the proximity sensor 60, the individual 50 may be prompted, either via an audio output or via a display 20, to manually commence a scanning operation.

Upon receiving a signal from the proximity sensor 60, the illustrated 3D camera 70 scans the individual 50 and equipment being worn by the individual 50, and compares the equipment detected on the individual 50 with a list of protective equipment that may be required to be worn in the restricted area 40. In order to allow detection of the protective equipment on the individual 50, indicia, such as brightly colored strips, stickers, or markings, may be attached to each protective equipment. The 3D camera 70 may therefore easily detect the indicia. Upon detection of the indicia, the scan signal may be transmitted to a server (not shown), and compared to a list of protective equipment specific to the restricted area 40, wherein a determination may be made as to whether the proper protective equipment is being worn by the individual 50.

For example if, based on the nature of the restricted area 40, it is necessary for the individual 50 to wear a safety hard hat, safety boots, a utility belt, and safety goggles, the 3D camera 70 may perform a full body scan of the individual 50 and detect any indicia that may be present on the body of the individual 50 or equipment being worn by the individual 50. The scanned image of the individual 50 may be transmitted to a server (not shown), and compared to a list of required protective equipment stored in the server. If one or more of the necessary protective equipment is not detected, a message may be displayed on a display 20 in order to alert the individual 50 that access to the restricted area 40 has failed. The display 20 may also present a message that lists the protective equipment that are required to be worn in the restricted area 40.

According to another exemplary embodiment, the illustrated 3D camera 70 scans the individual 50, detects items present on the body of the individual 50, and compares the items detected on the body of the individual 50 with a list of restricted items that are not allowed to be brought into the restricted area 40.

For example, if it is detected that the individual 50 has food or drinks on his/her body, and these items are among a list of restricted items stored in the server, the display 20 may issue a warning message, and the individual may be denied access to the restricted area 40.

According to another exemplary embodiment, the illustrated PPE checker 10 may also include a Radio-Frequency Identification (RFID) reader 80 that reads an RFID tag (not shown) that may be integrated with a personal badge of the individual 50. Alternately, the RFID tag may be paired with individual protective equipment elements. For example, RFID tags may be integrated with protective equipment such as safety hard hats, safety boots, utility belts, and safety goggles. As the individual 50 approaches a specific work area 40, where only authorized workers who wear or possess safety hard hats, safety boots, utility belts and safety goggles, etc., may enter, the illustrated proximity sensor 60 may detect the individual 50 when the individual 50 is within a predetermined range of the restricted area 40. Upon detection of the individual 50 by the proximity sensor 60, the RFID reader 80 may be automatically activated. Alternately, upon detection of the individual 50 by the proximity sensor 60, a message may be displayed on display 20 requesting that the individual 50 manually activate the RFID reader 80.

The illustrated RFID reader 80 may subsequently detect RFID tags that are present on the individual 50, or that are integrated on protective equipment worn by the individual 50, and transmit the scanned information to a server, which compares the received scanned information to a stored list of PPE's that are required for specific restricted area 40. If a determination is made that the individual 50 does not possess one or more of the required protective equipment, a visual alarm may be presented on the display 20 indicating that access to restricted area 40 has failed because the required protective equipment was not detected by the RFID reader 80.

According to the exemplary embodiment, although the individual 50 may have the authority to enter the restricted area 40, if one or more of the required protective equipment is not detected by the 3D camera 70 or the RFID reader 80, an access badge reader 30 may not be activated to grant access to the individual 50 to enter the restricted area 40. For example, in FIG. 1A, the illustrated individual 50 is not in possession of a safety hard hat. Accordingly, although the individual 50 may have the authority and/or training to enter the restricted area 40, since the individual 50 is not wearing, or is not in possession of, a safety hard hat, the access badge reader 30 may be deactivated, thus denying access of the individual 50 to the restricted area 40.

Figure 1B:
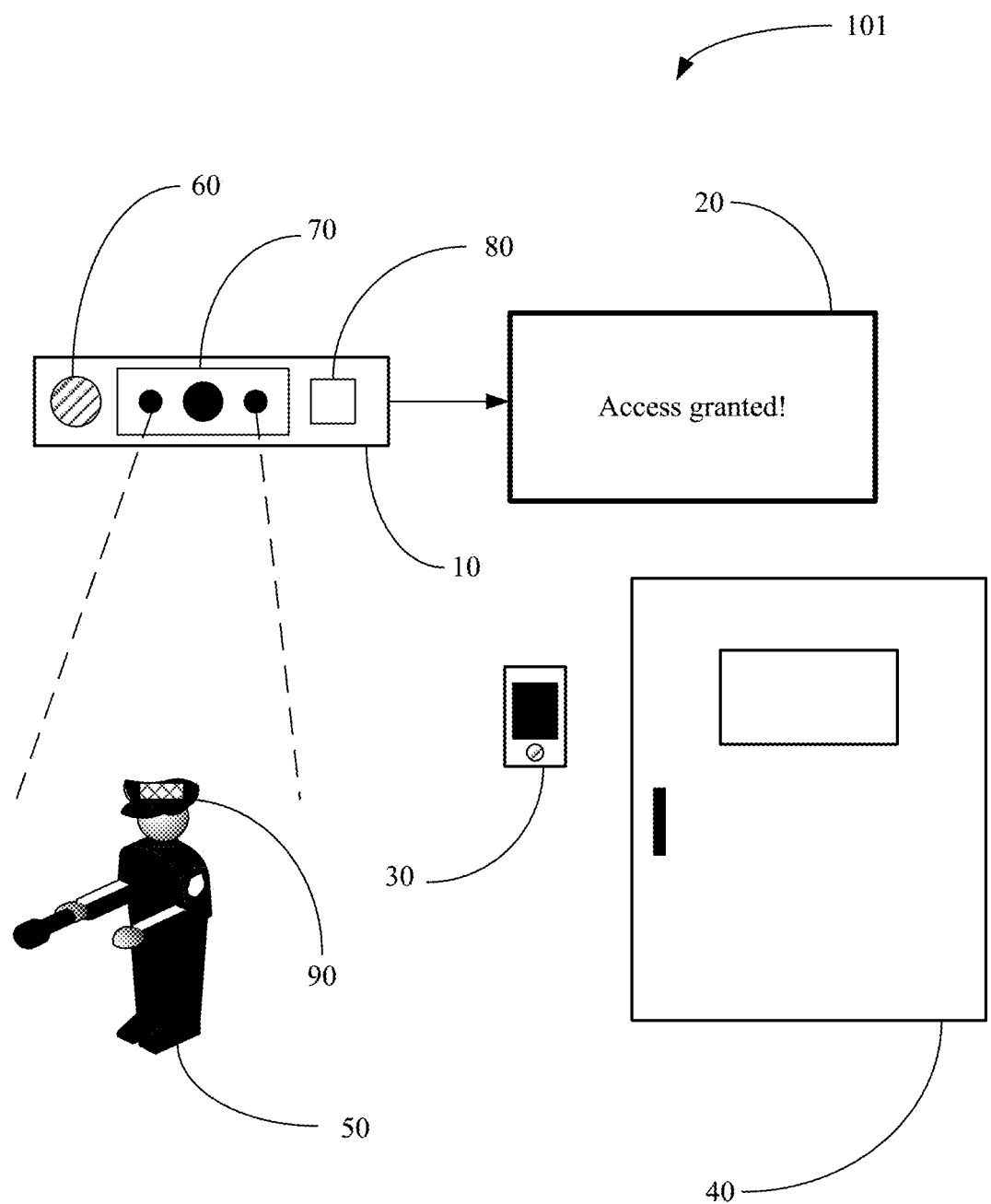

Turning now to FIG. 1B, an environment 101 of the protective equipment verification system is shown. According to the exemplary embodiment, if a scan of the individual 50 by one or more of the 3D camera 70 or the RFID reader 80 of the PPE checker 10 detects an RFID tag 90 or an indicia (not shown) that indicates that the individual 50 is wearing, or is in possession of, the necessary protective equipment (e.g., safety hard hats). Accordingly, a visual message may be presented on display 20 indicating that access is granted. Alternately, an audio alert message may be generated. At this time, the individual 50 may swipe an access badge across access badge reader 30 to enter restricted area 40.

According to another exemplary embodiment, the 3D camera 70 may include facial recognition technology that detects facial features of the individual 50 in order to authenticate and/or identify the individual. Therefore after, or simultaneously with, verification that the individual 50 is in possession of the proper protective equipment needed for access to restricted area 40, the facial recognition software may perform an authentication process with regard to the individual 50, and if the authentication process is successful, the individual 50 may be granted access to restricted area 40.

Figure 2:
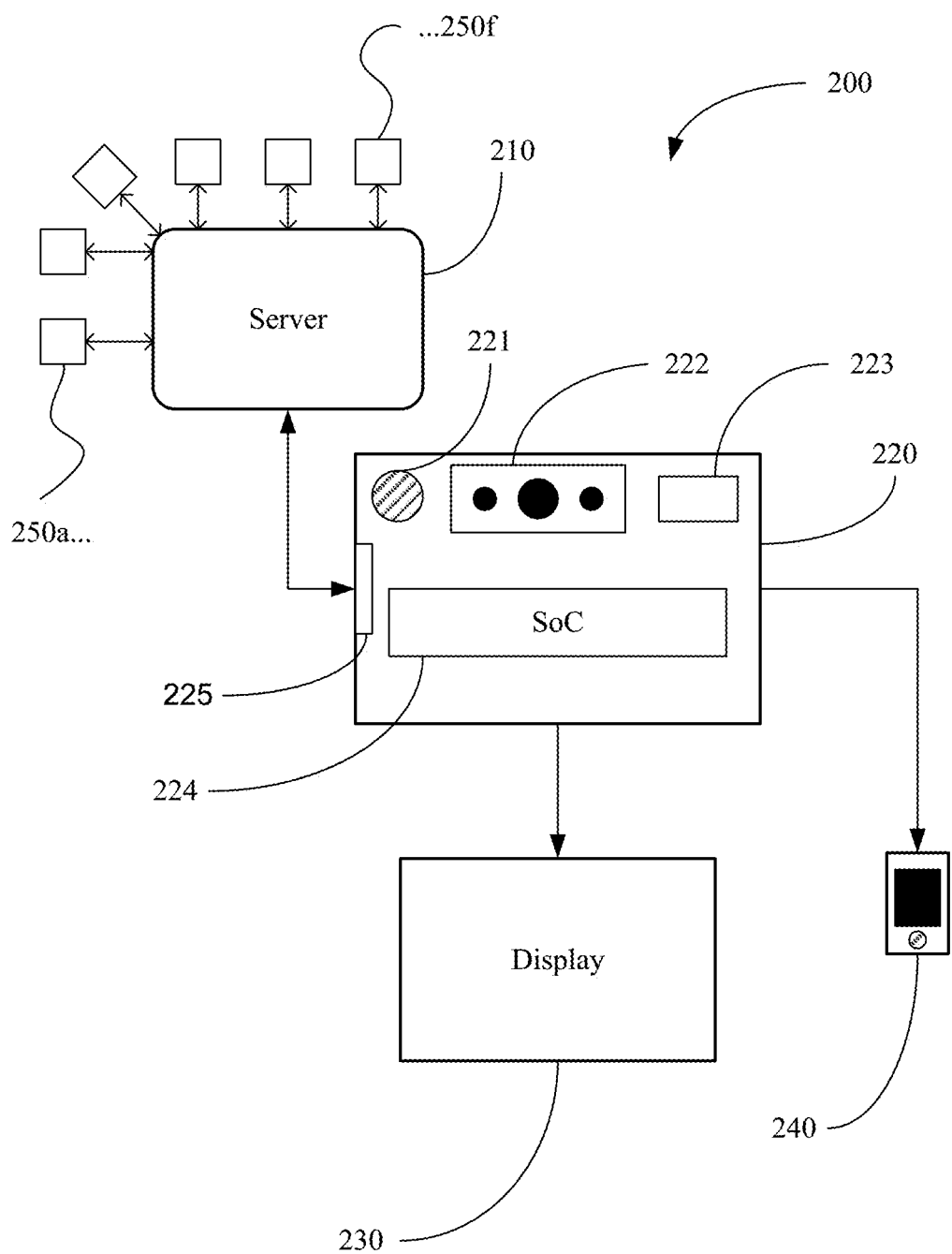
FIG. 2 is a block diagram of an example of a system to manage the use of personal protective equipment in a hazardous environment according to an embodiment.

Turning now to FIG. 2, a system 200 according to an exemplary embodiment is shown. In the illustrated example, a server 210 stores profiles or lists of the protective equipment required for entry into a plurality of specific restricted areas. For example, the server 210 may store a list of PPE's that an individual is required to wear or possess in order to enter specific restricted areas. Multiple PPE checkers 220 and 250 (250a-250f), each associated with a different specific restricted area, may be connected to the server 210 via a network. The server 210 may store a list of PPE's specific to each restricted area, a list of the individuals authorized to enter each of the restricted areas, and facial recognition features related to the individuals authorized to enter the restricted area 40 (FIGS. 1A and 1B).

As shown in FIG. 2, the illustrated PPE checker 220 may include a proximity sensor 221, a 3D camera 222, an RFID reader 223, a system on chip (SoC) 224, and a transceiver 225. As already discussed, after successfully verifying that an individual requesting entry to a restricted area is wearing, or is in possession of, the adequate protective equipment for the specific restricted area, and informing the individual via a display 230 that access to the restricted area has been granted, a signal may be transmitted to an access badge reader 240, and an alert, such as an audio tone or an LED light, may be activated to invite the individual to "badge" into the restricted area.

The transceiver 225 may transmit images captured by the 3D camera 222 to the server 210, and receive signals from the server 210.

According to another exemplary embodiment, one or more of cameras or RFID readers may be installed within the restricted area in order to perform intermittent scans of individuals while they are in the location to verify that the proper protective equipment are being worn.

The illustrated components of the PPE checker 220 may be implemented in logic instructions, configurable logic, fixed-functionality logic hardware, etc., or any combination thereof. Moreover, the PPE checker 220 may also include RAM (not shown), ROM (not shown), and flash memory (not shown), etc., to store images, videos, device profiles, authentication data, device statuses, control logic instructions, etc.

Turning now to FIG. 3, a method 300 of managing a protective equipment verification process is shown. The method 300 may generally be implemented in a device such as, for example, the PPE checker 10 (FIGS. 1A and 1B) or the PPE checker 220 (FIG. 2), already discussed. More particularly, the method 300 may be implemented as a set of logic instructions stored in a machine- or computer-readable medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in method 300 may be written in any combination of one or more programming languages, including an object oriented programming language such as JAVA, SMALLTALK, C++ or the like and conventional procedural programming languages, such as the ""C"" programming language or similar programming languages.

The illustrated method begins at processing block 305, where protective equipment requirements and entry protocols for specific locations or restricted areas are defined. For example, if the location or restricted area requires that the individuals who enter the location are required to have certain safety equipment such as a safety hard hat, safety boots, and goggles, this information is defined and stored in a server such as, for example, the server 210 (FIG. 2).

In processing block 310, the presence of an individual 50 (FIG. 1A) is detected at a restricted area (e.g., security checkpoint) such as, for example, the restricted area 40 (FIG. 1A). Illustrated processing block 315 activates a scan by one or more 3D cameras and transmits the results of the scan to a server. The scanned image may preferably be transmitted to a server 210 (FIG. 2) and compared to images stored in the server such as, for example, the server 210 (FIG. 2) to determine if location-specific protective equipment is worn by the individual in processing block 320. Although a single server 210 is illustrated in FIG. 2, multiple servers may be used to store images. For example, if the restricted area 40 pertains to a biohazard facility, server 210 may store images that are specific to the biohazard facility. If, on the other hand, the restricted area 40 pertains to an industrial facility, an additional server (not shown) may store images that are specific to the industrial facility.

Alternately, upon detection of the individual by the proximity sensor 60 (FIG. 1), an RFID reader 80 (FIG. 1A) may be activated, and the RFID tags 90 (FIG. 1B) may be detected, and the detected signals may be transmitted to the server 210 (FIG. 2) and compared to a list of protective equipment required for entry to the restricted area.

At processing block 325, a determination may be made as to whether the protective equipment detected by the 3D camera 70 (FIG. 1A) or the RFID reader 80 (FIG. 1A) meet the protective equipment requirements for the specific location. If, as indicated in block 350, the detected PPEs do not meet the protective equipment requirements, in processing block 355 a message may be displayed informing the individual that access to the location has been denied. A message may also be displayed in processing block 360 requesting that the individual confirm that the required protective equipment is being worn. Upon receiving confirmation from the individual that the proper protective equipment is being worn, in processing block 365 the individual is given permission to enter the specific location.

At processing block 340, the access badge reader 30 (FIG. 1A) is activated. The individual may swipe the access badge reader 30 (FIG. 1A) with an assigned badge, and enter the restricted area after being authenticated in processing block 345.

In processing block 370, the process ends, and the sensor(s) in the PPE checker 10 (FIG. 1A) may be reset, and the 3D camera 70 (FIG. 1A) may be turned off.

Returning to processing block 325, if a determination is made that the protective equipment detected by the 3D camera 70 (FIG. 1A) or the RFID reader 80 (FIG. 1A) meets the protective equipment requirements for the specific location at processing block 330, a message may be displayed on display 20 (FIG. 1A) informing the individual that he/she has been granted access to the restricted area at processing block 335.

At processing block 340, the access badge reader 30 (FIG. 1A) may be activated. The individual may swipe the access badge reader 30 (FIG. 1A) with an assigned badge, and enter the restricted area after being authenticated in processing block 345.

In processing block 370, the process ends, and the sensor(s) in the PPE checker 10 (FIG. 1A) may be reset, and the 3D camera 70 (FIG. 1A) may be turned off.

Turning now to FIG. 4, another method 400 of managing a protective equipment verification process is shown. The method 400 may generally be implemented in a device such as, for example, a PPE checker 10 (FIGS. 1A and 1B) or PPE checker 220 (FIG. 2), already discussed. More particularly, the method 400 may be implemented as a set of logic instructions stored in a machine- or computer-readable medium of a memory such as RAM, ROM, PROM, firmware, flash memory, etc., in configurable logic such as, for example, PLAs, FPGAs, CPLDs, in fixed-functionality logic hardware using circuit technology such as ASIC, CMOS or TTL technology, or any combination thereof.

The illustrated method begins at processing block 405, where protective equipment requirements and entry protocols for specific locations or restricted areas are defined. For example, if the location or restricted area requires that the individuals who enter the location are required to have certain safety equipment such as a safety hard hat, safety boots, and goggles, this information is defined and stored in a server 210 (FIG. 2).

In processing block 410, an individual 50 (FIG. 1A) who wishes entry to a restricted area 40 (FIG. 1A) approaches a security checkpoint. A proximity sensor 60 (FIG. 1A) detects the presence of the individual, and may activate a 3D camera 70 (FIG. 1A) to perform a body scan of the individual in processing block 415. The scanned image may be transmitted to a server 210 (FIG. 2) and compared to images stored in the server 210 (FIG. 2) to determine if location-specific protective equipment is worn by the individual in processing block 420.

At processing block 425, a determination is made whether the protective equipment detected by the 3D camera 70 (FIG. 1A) or the RFID reader 80 (FIG. 1A) meet the protective equipment requirements for the specific location. If, as indicated in block 455, the detected PPEs do not meet the location-specific protective equipment requirements, in processing block 460 a message may be displayed informing the individual that access to the location has been denied. The message may also inquire whether the individual would like to retry the verification process.

If at block 465 the individual confirms that he/she wishes to retry the verification process, at processing block 470 the 3D camera 70 (FIG. 1A) of the RFID reader 80 (FIG. 1A) may perform a second body scan of the individual to determine if the location-specific protective equipment requirements are met at processing block 475. If, at block 480, the second body scan determines that the protective equipment requirements are met, a message may be displayed at processing block 435 alerting the individual that he/she has been granted access to the restricted location. An access badge reader 30 (FIG. 1A) may be activated at processing block 440, and at processing block 445, the individual swipes an access badge across the access badge reader 30 (FIG. 1A), and the individual may be granted entry to the restricted location. At processing block 450, the proximity sensor(s) 60 (FIG. 1A) may be reset, and the 3D camera 70 (FIG. 1A) may be turned off.

If, however, it is determined at processing block 475 that the second body scan also indicates that the individual is not wearing the necessary protective equipment, the display 20 (FIG. 1A) may display an alert at processing block 500 denying access to the restricted area, and requesting that the individual obtain the proper protective equipment. At processing block 495, the proximity sensor 60 (FIG. 1A) may be reset and the 3D camera 70 (FIG. 1A) may be turned off.

Returning to processing block 460 where a message inquires whether the individual would like to retry the verification process, if the individual indicates at processing block 485 that he/she does not want to retry the verification process, then at processing block 495 the proximity sensor(s) 60 (FIG. 1A) may be reset, and the 3D camera 70 (FIG. 1A) may be turned off.

Returning to processing block 425, if an initial scan of the individual indicates that the individual meets the protective equipment requirements for the specific location, in processing block 435 a message may be displayed informing the individual that access to the location has been granted. An access badge reader 30 (FIG. 1A) may be activated at processing block 440, and at processing block 445, the subject or individual is authenticated for entry into the secure area. Block 445 may include detecting that the individual has swiped an access badge across an access badge reader, and the individual may be granted entry to the restricted location. At processing block 450, the proximity sensor(s) 60 (FIG. 1A) may be reset, and the 3D camera 70 (FIG. 1A) may be turned off.

Turning now to FIG. 5, a method 600 of managing a protective equipment verification process is shown. The method 600 may generally be implemented in a device such as, for example, a PPE checker 10 (FIGS. 1A and 1B) or PPE checker 220 (FIG. 2), already discussed. More particularly, the method 600 may be implemented as a set of logic instructions stored in a machine- or computer-readable medium of a memory such as RAM, ROM, PROM, firmware, flash memory, etc., in configurable logic such as, for example, PLAs, FPGAs, CPLDs, in fixed-functionality logic hardware using circuit technology such as ASIC, CMOS or TTL technology, or any combination thereof.

The illustrated method begins at processing block 610, where the presence of an individual is detected when the individual approaches the entrance to a restricted area. At processing block 620, a body scan may be performed on the individual, and an image of the individual may be captured. At processing block 630, RFID tags, which may be integrated with the protective equipment, are identified, and at processing block 640, information is acquired from the RFID tags, and a determination is made if all of the required protective equipment are being worn by the individual.

ADDITIONAL NOTES AND EXAMPLES

Example 1 may include a system to monitor utilization of protective equipment in restricted areas, the system comprising: a proximity sensor to detect a presence of a subject within a predetermined range of a restricted area, a detection component, an equipment manager to acquire information from the detection component and determine if protective equipment is worn by the subject, a display device to display information indicating whether the protective equipment is worn by the subject, a badge identification component to grant or deny access to the restricted area based on the information acquired from the detection component, and a system on chip (SoC) platform to control the proximity sensor and the detection component.

Example 2 may include the system of example 1, wherein the detection component includes a three-dimensional (3D) camera to capture an image of the subject and a Radio-Frequency Identification (RFID) scanner to identify one or more tags attached to the subject, and the proximity sensor is to activate the 3D camera upon detecting the presence of the subject.

Example 3 may include the system of example 2, further comprising a remote server to store protective equipment information, a list of subjects authorized to enter the restricted area, a list of restricted items, and the captured image of the subject.

Example 4 may include the system of example 3, wherein a captured full body image of the subject is transmitted and stored at the remote server.

Example 5 may include the system of example 2, wherein the 3D camera includes a facial recognition component to detect facial features of the subject.

Example 6 may include the system of any one of examples 3 to 5, wherein the equipment manager is to compare the information acquired from the one or more of the 3D camera and the RFID scanner with the protective equipment information stored in the remote server.

Example 7 may include an apparatus to monitor utilization of protective equipment in restricted areas, the apparatus comprising: a proximity sensor to detect a presence of a subject within a predetermined range of a restricted area, a detection component, and an equipment manager to determine whether protective equipment is worn by the subject based on one or more tags attached to the subject.

Example 8 may include the apparatus of example 7, wherein the detection component includes a camera to capture an image of the subject and a scanner to identify the one or more tags attached to the subject, and the proximity sensor is to activate the camera upon detecting the presence of the subject.

Example 9 may include the apparatus of example 8, further comprising a transceiver to transmit the captured image of the subject to a remote server and receive signals from the remote server.

Example 10 may include the apparatus of example 9, wherein the camera is to perform a full body scan of the subject and transmit the captured image to the remote server.

Example 11 may include the apparatus of example 8, wherein the camera includes a facial recognition component to detect facial features of the subject.

Example 12 may include the apparatus of any one of examples 9-11, wherein the equipment manager is to acquire information from the captured image and compare the information acquired from the captured image with pre-stored protective equipment information.

Example 13 may include a method to monitor utilization of protective equipment in restricted areas, the method comprising: detecting a presence of a subject within a predetermined range of a restricted area, and determining whether protective equipment is worn by the subject based on one or more tags attached to the subject.

Example 14 may include the method of example 13, further comprising activating a three-dimensional (3D) camera upon detecting the presence of the subject, capturing an image of the subject, and identifying the one or more tags attached to the subject.

Example 15 may include the method of example 14, further comprising transmitting the captured image of the subject to a remote server and receiving signals from the remote server.

Example 16 may include the method of example 15, further comprising performing a full body scan of the subject and transmitting the captured image to the remote server.

Example 17 may include the method of example 14, further comprising detecting facial features of the subject.

Example 18 may include the method of any one of examples 15-17, acquiring information from the captured image, and comparing the information acquired from the captured image with pre-stored protective equipment information.

Example 19 may include at least one computer readable storage medium comprising a set of instructions, which when executed by an apparatus, cause the apparatus to: detect a presence of a subject within a predetermined range of a restricted area, and determine whether protective equipment is worn by the subject based on the one or more tags and the captured image.

Example 20 may include the at least one computer readable storage medium of example 19, wherein the instructions, when executed, cause the apparatus to activate a three-dimensional (3D) camera upon detecting the presence of the subject, capture an image of the subject, and identify one or more tags attached to the subject.

Example 21 may include the at least one computer readable storage medium of example 20, wherein the instructions, when executed, cause the apparatus to transmit the captured image of the subject to a remote server and receive signals from the remote server.

Example 22 may include the at least one computer readable storage medium of example 21, wherein the instructions, when executed, cause the apparatus to perform a full body scan of the subject and transmit the captured image to the remote server.

Example 23 may include the at least one computer readable storage medium of example 20, further comprising detecting facial features of the subject.

Example 24 may include the at least one computer readable storage medium of any one of examples 21-23, wherein the instructions, when executed, cause the apparatus to acquire information from the captured image, and compare the information acquired from the captured image with pre-stored protective equipment information.

Example 25 may include an apparatus to monitor utilization of protective equipment in restricted areas, the apparatus comprising: means for detecting a presence of a subject within a predetermined range of a restricted area, and means for determining whether protective equipment is worn by the subject based on one or more tags attached to the subject.

Example 26 may include the apparatus of example 25, further comprising means for capturing an image of the subject; and means for identifying one or more tags attached to the subject; and means for activating a three-dimensional (3D) camera upon detecting the presence of the subject.

Example 27 may include the apparatus of example 26, further comprising means for transmitting the captured image of the subject to a remote server and receiving signals from the remote server.

Example 28 may include the apparatus of example 27, further comprising means for performing a full body scan of the subject and transmitting the captured image to the remote server.

Example 29 may include the apparatus of example 26, further comprising means for detecting facial features of the subject.

Example 30 may include the apparatus of any one of examples 27-29, further comprising means for acquiring information from the captured image and comparing the information acquired from the captured image with pre-stored protective equipment information.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
   a proximity sensor to detect a presence of a subject within a predetermined range of a restricted area;
   a detection component;
   an equipment manager to acquire information from the detection component and determine if protective equipment is worn by the subject;
   a display device to display information indicating whether the protective equipment is worn by the subject;
   a badge identification component to grant or deny access to restricted area based on the information acquired from the detection component, wherein the badge identification component performs authentication of the subject only if the protective equipment worn by the subject is determined to meet one or more requirements, and
   a system on chip (SoC) platform to control the proximity sensor and the detection component.

2. The system of claim 1, wherein the detection component includes a three-dimensional (3D) camera to capture an image of the subject and a Radio-Frequency Identification (RFID) scanner to identify one or more tags attached to the subject, and the proximity sensor is to activate the 3D camera upon detecting the presence of the subject.

3. The system of claim 2, further comprising a remote server to store protective equipment information, a list of subjects authorized to enter the restricted area, a list of restricted items, and the captured image of the subject.

4. The system of claim 3, wherein a captured full body image of the subject is transmitted and stored at the remote server.

5. The system of claim 2, wherein the 3D camera includes a facial recognition component to detect facial features of the subject.

6. The system of claim 3, wherein the equipment manager is to compare the information acquired from the one or more of the 3D camera and the RFID scanner with the protective equipment information stored in the remote server.

7. An apparatus comprising:
a proximity sensor to detect a presence of a subject within a predetermined range of a restricted area;
a detection component;
an equipment manager to determine whether protective equipment is worn by the subject based on one or more tags attached to the subject; and
a badge identification component to perform authentication of the subject only if the protective equipment worn by the subject is determined to meet one or more requirements.

8. The apparatus of claim 7, wherein the detection component includes a camera to capture an image of the subject and a scanner to identify the one or more tags attached to the subject, and the proximity sensor is to activate the camera upon detecting the presence of the subject.

9. The apparatus of claim 8, further comprising a transceiver to transmit the captured image of the subject to a remote server and receive signals from the remote server.

10. The apparatus of claim 9, wherein the camera is to perform a full body scan of the subject and transmit the captured image to the remote server.

11. The apparatus of claim 8, wherein the camera includes a facial recognition component to detect facial features of the subject.

12. The apparatus of claim 9, wherein the equipment manager is to acquire information from the captured image and compare the information acquired from the captured image with pre-stored protective equipment information.

13. A method comprising:
detecting a presence of a subject within a predetermined range of a restricted area;
determining whether protective equipment is worn by the subject based on one or more tags attached to the subject; and
authenticating the subject only if the protective equipment worn by the subject is determined to meet one or more requirements.

14. The method of claim 13, further comprising activating a three-dimensional (3D) camera upon detecting the presence of the subject, capturing an image of the subject, and identifying the one or more tags attached to the subject.

15. The method of claim 14, further comprising transmitting the captured image of the subject to a remote server and receiving signals from the remote server.

16. The method of claim 15, further comprising performing a full body scan of the subject and transmitting the captured image to the remote server.

17. The method of claim 14, further comprising detecting facial features of the subject.

18. The method of claim 15, further comprising:
acquiring information from the captured image; and
comparing the information acquired from the captured image with pre-stored protective equipment information.

19. At least one computer readable storage medium comprising a set of instructions, which when executed by an apparatus, cause the apparatus to:
detect a presence of a subject within a predetermined range of a restricted area;
determine whether protective equipment is worn by the subject based on one or more tags attached to the subject; and
authenticate the subject only if the protective equipment worn by the subject is determined to meet one or more requirements.

20. The at least one computer readable storage medium of claim 19, wherein the instructions, when executed, cause the apparatus to activate a three-dimensional (3D) camera upon detecting the presence of the subject, capture an image of the subject, and identify one or more tags attached to the subject.

21. The at least one computer readable storage medium of claim 20, wherein the instructions, when executed, cause the apparatus to transmit the captured image of the subject to a remote server and receive signals from the remote server.

22. The at least one computer readable storage medium of claim 21, wherein the instructions, when executed, cause the apparatus to perform a full body scan of the subject and transmit the captured image to the remote server.

23. The at least one computer readable storage medium of claim 20, further comprising detecting facial features of the subject.

24. The at least one computer readable storage medium of claim 21, wherein the instructions, when executed, cause the apparatus to acquire information from the captured image, and
compare the information acquired from the captured image with pre-stored protective equipment information.

\* \* \* \* \*